(12) United States Patent
Ogawa et al.

(10) Patent No.: US 10,906,591 B2
(45) Date of Patent: Feb. 2, 2021

(54) WHEEL HOUSE UNIT STRUCTURE

(71) Applicant: TOYOTA JIDOSHA KABUSHIKI KAISHA, Toyota (JP)

(72) Inventors: Satoshi Ogawa, Toyota (JP);
Tomokazu Yamaguchi, Kariya (JP);
Tomohiko Nagasaka, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 33 days.

(21) Appl. No.: 16/359,408

(22) Filed: Mar. 20, 2019

(65) Prior Publication Data

US 2019/0300067 A1 Oct. 3, 2019

(30) Foreign Application Priority Data

Mar. 27, 2018 (JP) .................................. 2018-059437

(51) Int. Cl.
*B62D 25/08* (2006.01)
*B62D 25/18* (2006.01)

(52) U.S. Cl.
CPC ........... *B62D 25/088* (2013.01); *B62D 25/18* (2013.01)

(58) Field of Classification Search
CPC ...... B62D 25/088; B62D 25/18; B62D 21/09; B60G 11/16; B60G 11/20; B60G 11/28; B60G 2204/128
See application file for complete search history.

(56) References Cited

U.S. PATENT DOCUMENTS

| | | | | |
|---|---|---|---|---|
| 4,213,631 A | * | 7/1980 | Wilkerson | B60G 15/068 280/86.752 |
| 4,408,794 A | * | 10/1983 | Harasaki | B62D 25/088 296/198 |
| 5,244,248 A | * | 9/1993 | Bovellan | B62D 21/152 296/187.09 |
| 2007/0215402 A1 | * | 9/2007 | Sasaki | B62D 25/088 180/232 |
| 2013/0134742 A1 | * | 5/2013 | Mildner | B62D 25/088 296/203.02 |
| 2014/0375081 A1 | * | 12/2014 | Kuriyama | B62D 25/082 296/187.1 |
| 2015/0166117 A1 | * | 6/2015 | Ohoka | B62D 25/08 296/193.09 |
| 2016/0185197 A1 | | 6/2016 | Ueoka et al. | |
| 2018/0273110 A1 | * | 9/2018 | Masuda | B62D 25/02 |
| 2020/0114976 A1 | * | 4/2020 | Matsuoka | B62D 25/14 |

FOREIGN PATENT DOCUMENTS

| | | |
|---|---|---|
| JP | 2011-161937 | 8/2011 |
| JP | 2016-117459 | 6/2016 |

* cited by examiner

*Primary Examiner* — Frank B Vanaman
(74) *Attorney, Agent, or Firm* — Oblon, McClelland, Maier & Neustadt, L.L.P.

(57) ABSTRACT

A wheel house unit structure is provided which has a wheel house including a curved surface portion, a circular cylindrical suspension tower provided at the curved surface portion, at the vehicle front side, of the wheel house, and a reinforcement member connected to the curved surface portion of the wheel house and to an outer circumference of the suspension tower. The reinforcement member has a ridge which connects the curved surface portion and the outer circumference of the suspension tower in a front-and-rear direction of the vehicle, and forms a closed cross section structure with the curved surface portion of the wheel house and the outer circumference of the suspension tower.

3 Claims, 15 Drawing Sheets

WHEEL HOUSE UNIT STRUCTURE

CROSS REFERENCE TO RELATED APPLICATION

This application claims priority to Japanese Patent Application No. 2018-059437 filed on Mar. 27, 2018, which is incorporated herein by reference in its entirety including the specification, claims, drawings, and abstract.

TECHNICAL FIELD

The present disclosure relates to a wheel house unit structure having a reinforcement member which connects a wheel house and a suspension tower.

BACKGROUND

Because a wheel house which houses tires and wheels of a vehicle is assembled by welding a press-molded sheet metal, there may be cases where the wheel house is deformed by a local load. In consideration of this, a structure is proposed in which, when a rear deck cover is provided over the wheel house, a bracket is attached over the wheel house, and the deck cover is attached to the bracket (for example, refer to JP 2016-117459 A). Further, a structure is proposed in which a reinforcement member is attached over the wheel house, and a retractor of a seatbelt device of a rear seat is attached to the reinforcement member (for example, refer to JP 2011-161937 A).

In recent years, vehicles having no roof, such as convertible cars, open cars, etc. have come into wide use. In these vehicles without roofs, when loads of opposite phases in a up-and-down direction are applied to left and right suspension towers at a front side of the vehicle, a twisting load is applied to a vehicle body, and significant deformation may be caused at a connection part between the wheel house and the suspension tower at the rear side of the vehicle. As a countermeasure for this, it is effective to thicken a sheet forming the wheel house, but in this case, the weight of the vehicle is significantly increased.

An advantage of the present disclosure lies in effective suppression of the deformation of the connection part between the wheel house and the suspension tower with a small increase in the weight.

SUMMARY

According to one aspect of the present disclosure, there is provided a wheel house unit structure comprising: a wheel house having a curved surface portion which is convex in an upward direction of a vehicle, which has a U shape cross section in a width direction, and which extends, in a front-and-rear direction of the vehicle, in an arc shape which is convex in the upward direction of the vehicle; a circular cylindrical suspension tower provided at a vertex region, in the front-and-rear direction of the vehicle, of the curved surface portion of the wheel house; and a reinforcement member that is connected to the curved surface portion, at a vehicle front side, of the wheel house and to an outer circumference of the suspension tower, wherein the reinforcement member comprises a ridge which extends in the front-and-rear direction of the vehicle and which connects, in the front-and-rear direction of the vehicle, the curved surface portion, at the vehicle front side, of the wheel house, and the outer circumference of the suspension tower, and the reinforcement member forms a closed cross section structure with the curved surface portion, at the vehicle front side, of the wheel house and the outer circumference of the suspension tower.

As described, by connecting, to the curved surface portion, at the vehicle front side, of the wheel house and the outer circumference of the suspension tower, the reinforcement member having the ridge which connects, in the front-and-rear direction of the vehicle, the curved surface portion, at the vehicle front side, of the wheel house and the outer circumference of the suspension tower, and which forms a closed cross section structure with the curved surface portion, at the vehicle front side, of the wheel house and the outer circumference of the suspension tower, it becomes possible to suppress significant deformation of the connection portion between the wheel house and the suspension tower due to falling of the suspension tower toward the front side of the vehicle. Because the reinforcement member has a smaller increase in weight compared to a case where the thickness of the sheet forming the wheel house is thickened, the deformation of the connection part between the wheel house and the suspension tower can be effectively suppressed with a small increase in weight.

According to another aspect of the present disclosure, in the wheel house unit structure, the reinforcement member may comprise a suspension tower-side flange which has a partially circular cylindrical shape and which is connected to the outer circumference of the suspension tower, an upper flange which is connected to the curved surface portion, at the vehicle front side, of the wheel house, and a plate portion which is connected to the suspension tower-side flange and the upper flange, and the ridge may be a portion which is provided on the plate portion, which has a groove-shape cross section which is convex in the upward direction of the vehicle, and which extends in the front-and-rear direction of the vehicle.

As described, because the reinforcement member is formed by a plate member, it becomes possible to suppress occurrence of significant deformation of the connection part between the wheel house and the suspension tower with a small increase in weight.

According to another aspect of the present disclosure, in the wheel house unit structure, the wheel house may include a flat-shape skirt portion which extends from the curved surface portion in a downward direction of the vehicle, and the reinforcement member may comprise a ridge and a side ridge which extend in the front-and-rear direction of the vehicle, and which connect, in the front-and-rear direction of the vehicle, the curved surface portion, at the vehicle front side, of the wheel house and the outer circumference of the suspension tower, and the reinforcement member may be connected to the curved surface portion, at the vehicle front side, of the wheel house, the outer circumference of the suspension tower, and an inner side, in the width direction of the vehicle, of the skirt portion of the wheel house, to form closed cross section structures with the curved surface portion, at the vehicle front side, of the wheel house and the outer circumference of the suspension tower, and with the inner side, in the width direction of the vehicle, of the skirt portion of the wheel house and the outer circumference of the suspension tower.

As described, in addition to the connection between the curved surface portion, at the vehicle front side, of the wheel house and the outer circumference of the suspension tower, by connecting the inner side, in the width direction of the vehicle, of the skirt portion of the wheel house and the outer circumference of the suspension tower with the reinforcement member having the ridge and the side ridge, it becomes possible to further increase rigidity of the wheel house unit as a whole, and to more effectively suppress significant deformation of the connection part between the wheel house and the suspension tower.

According to another aspect of the present disclosure, in the wheel house unit structure, the reinforcement member may comprise: a suspension tower-side flange which has a partial circular cylindrical shape and which is connected to the outer circumference of the suspension tower; a skirt-side flange which is a plate member which has a partial circular disc shape, which is connected to the inner side, in the width direction of the vehicle, of the skirt portion of the wheel house; an upper flange which is connected to the curved surface portion, at the vehicle front side, of the wheel house; and a plate member which is connected to the suspension tower-side flange, the skirt-side flange, and the upper flange, the plate member may comprise an upper plate which connects the suspension tower-side flange and the upper flange, and a side plate which is folded from the upper plate in the downward direction of the vehicle and which connects the upper plate and the skirt-side flange of the wheel house, the ridge may be a portion which is provided on the upper plate, which has a groove-shape cross section which is convex in the upward direction of the vehicle, and which extends in the front-and-rear direction of the vehicle, and the side ridge may be a fold portion of the side plate.

As described, because the reinforcement member is formed from a plate member, it becomes possible to suppress significant deformation of the connection part between the wheel house and the suspension tower with a small increase in weight.

According to the present disclosure, deformation of the connection part between the wheel house and the suspension tower can be effectively suppressed with a small increase in weight.

BRIEF DESCRIPTION OF DRAWINGS

Embodiment(s) of the present disclosure will be described based on the following figures, wherein.

DESCRIPTION OF EMBODIMENTS

Figure 1:
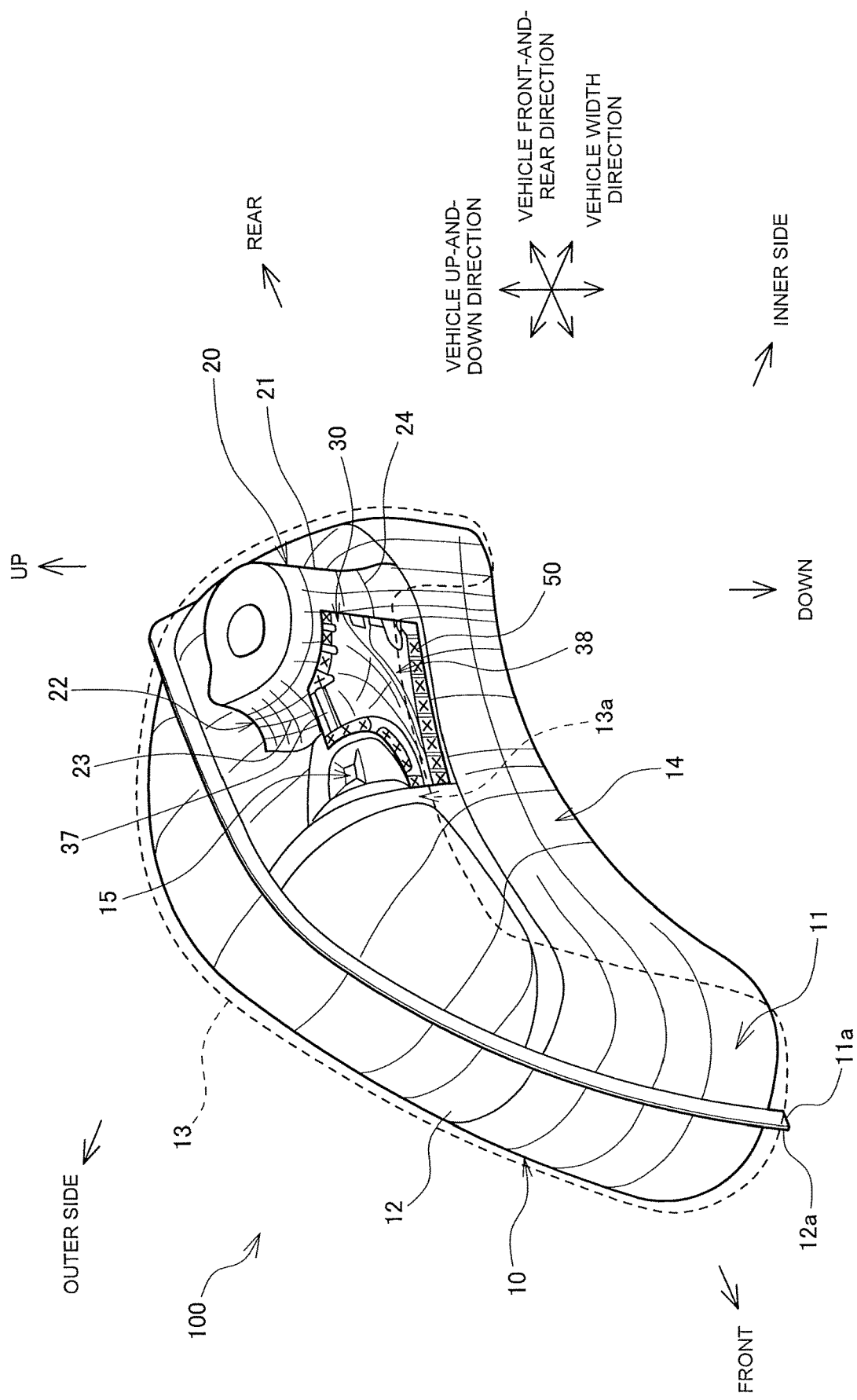
FIG. 1 is a perspective diagram showing a structure of a wheel house unit structure according to an embodiment of the present disclosure.

A wheel house unit structure 100 according to an embodiment of the present disclosure will now be described with reference to the drawings. As shown in FIG. 1, the wheel house unit structure 100 according to the present embodiment comprises a wheel house 10 at a rear side of a vehicle, a suspension tower 20, and a reinforcement member 30.

The wheel house 10 is a member which is convex in an upward direction of the vehicle, and which has a U-shape cross section in a width direction, in which a wheel house inner 11 and a wheel house outer 12 are connected by flanges 11a and 12a. The wheel house 10 houses an upper portion of a rear wheel therein. The wheel house 10 includes a curved surface portion 13 which is convex in the upward direction of the vehicle, which has a U-shape cross section in the width direction, and which extends in a front-and-rear direction of the vehicle in an arc shape which is convex in the upward direction of the vehicle, and a flat-shape skirt portion 14 which extends from the curved surface portion 13 toward a lower side of the vehicle.

Figure 2:
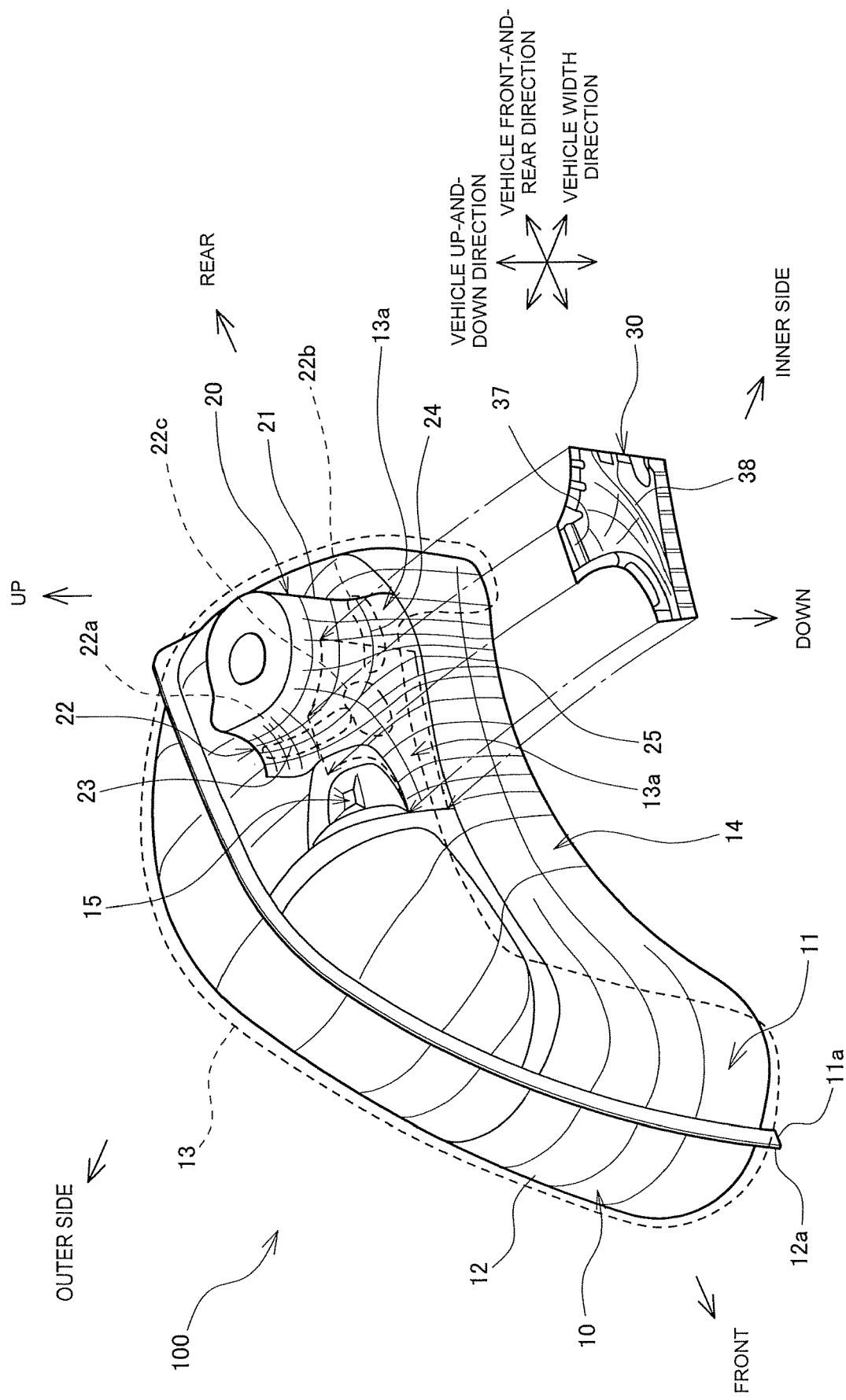
FIG. 2 is an exploded perspective diagram showing a wheel house unit structure according to an embodiment of the present disclosure.

At a vertex region, in the front-and-rear direction of the vehicle, of the curved surface portion 13 of the wheel house inner 11, the suspension tower 20 having a circular cylindrical shape and extending in an up-and-down direction of the vehicle is provided. Further, a recess 15 is formed in the vehicle front side of the suspension tower 20. The suspension tower 20 has a tube portion 21 on an upper end side, and a connection part 22 which spreads from the tube portion 21 in a trumpet shape, and which is connected to the curved surface portion 13 having a reverse U shape. As shown in FIG. 2, the connection part 22 comprises a connection part 22a between the tube portion 21 and a vehicle upper portion of the curved surface portion 13, at the vehicle front side of the suspension tower 20, a connection part 22b between the tube portion 21 and a shoulder 13a of the curved surface portion 13, at an inner side, in a width direction of the vehicle, of the suspension tower 20, and a connection part 22c at an intermediate position between the connection part 22a and the connection part 22b, and which connects tube portion 21 and the shoulder 13a of the curved surface portion 13 at a vehicle slanted front side of the suspension tower 20.

The reinforcement member 30 is a plate-shape member which is connected to the curved surface portion 13, at the vehicle front side, of the wheel house 10, an outer circumference of the suspension tower 20, and an inner side, in the width direction of the vehicle, of the skirt portion 14 of the wheel house 10, and comprises a ridge 37 and a side ridge 38. The ridge 37 and the side ridge 38 are portions which are convex in the upward direction of the vehicle, which extend in the front-and-rear direction of the vehicle, and which connect, in the front-and-rear direction of the vehicle, the curved surface portion 13, at the vehicle front side, of the wheel house 10 and the outer circumference of the tube portion 21 of the suspension tower 20.

As shown in FIG. 2, the reinforcement member 30 extends over the vehicle upper side of the connection part, and is connected to the curved surface portion 13, at the vehicle front side, of the wheel house 10, the outer circumference of the tube portion 21 of the suspension tower 20, and the inner side, in the width direction of the vehicle, of the skirt portion 14 of the wheel house 10. The reinforcement member 30 forms a closed cross section structure with the curved surface portion 13, having the reverse U shape, of the wheel house 10, and the outer circumference of the tube portion 21 of the suspension tower 20, and also forms a closed cross section structure with the skirt portion 14 of the wheel house 10 and the outer circumference of the tube portion 21 of the suspension tower 20.

Figure 3:
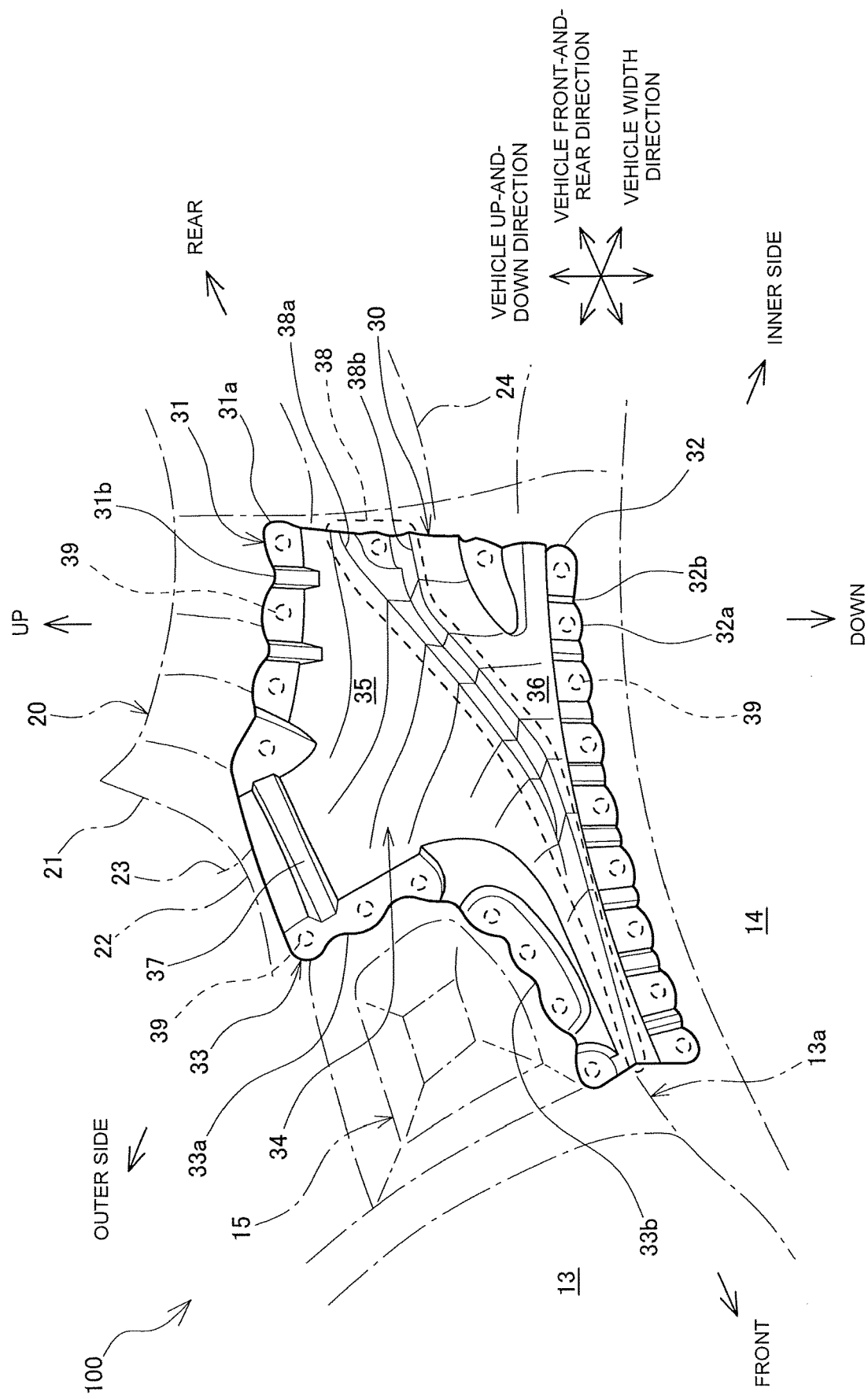
FIG. 3 is a perspective diagram showing a reinforcement member of a wheel house unit structure according to an embodiment of the present disclosure.

As shown in FIG. 3, the reinforcement member 30 includes a suspension tower-side flange 31, a skirt-side flange 32, an upper flange 33, and a plate member 34.

The suspension tower-side flange 31 is a plate member having a partial circular tubular shape with a central angle of approximately 90 degrees, and which is connected to the outer circumference of the tube portion 21 of the suspension tower 20. The suspension tower-side flange 31 includes a reinforcement bead 31b having a groove-shape cross section which extends in the up-and-down direction of the vehicle, and an arc plate portion 31a which includes a welding area 39 between the arc plate portion 31a and the reinforcement bead 31b. The skirt-side flange 32 is a plate member having a partial circular plate shape connected to the inner side, in the width direction of the vehicle, of the skirt portion 14 of the wheel house 10. The skirt-side flange 32 includes a reinforcement bead 32b having a groove-shape cross section extending in the up-and-down direction of the vehicle, and a flat plate portion 32b which includes a spot welding area 39 between the flat plate portion 32a and the reinforcement bead 32b. The upper flange 33 is a plate member connected to the vehicle upper portion of the curved surface portion 13, having the reverse U shape and at the vehicle front side, of the wheel house 10. The upper flange 33 includes a first flange 33a which extends in the width direction of the vehicle on the side of the suspension tower 20, and a second flange 33b which extends in the front-and-rear direction of the vehicle at the inner side, in the width direction of the vehicle, of the first flange 33a. For the first flange 33a and the second flange 33b, respective spot welding areas 39 are provided.

The plate member 34 is a folded plate member connected to the suspension tower-side flange 31, the skirt-side flange 32, and the upper flange 33. The plate member 34 includes an upper plate 35, and a side plate 36 which is folded from the upper plate 35 in the downward direction of the vehicle and which connects the upper plate 35 and the skirt-side flange 32 of the wheel house 10.

The upper plate 35 is a plate member which connects the suspension tower-side flange 31 and the upper flange 33, and the ridge 37 which has a groove cross section which is convex in the upward direction of the vehicle and which extends in the front-and-rear direction of the vehicle is provided at an outer side portion, in the width direction of the vehicle, of the upper plate 35. The side plate 36 includes a first fold portion 38a which is folded from the upper plate 35 in the downward direction of the vehicle, and a second fold portion 38b which is folded in the downward direction of the vehicle, from a position extending horizontally from the first fold portion 38a to an inner side in the width direction of the vehicle. The first fold portion 38a and the second fold portion 38b of the side plate 36 form the side ridge 38.

The reinforcement member 30 is attached to the outer circumference of the tube portion 21 of the suspension tower 20, the inner side, in the width direction of the vehicle, of the skirt portion 14 of the wheel house 10, and the curved surface portion 13, at the vehicle front side, of the wheel house 10, by spot welding the respective spot welding areas 39 of the suspension tower-side flange 31, the skirt-side flange 32, and the upper flange 33, as shown by an "X" in FIG. 1. As shown in FIGS. 1 and 3, a periphery of a rear end, in the front-and-rear direction of the vehicle, of the side plate 36 is attached to an outer surface of the suspension tower 20 along a longitudinal direction of the suspension tower 20, by the spot welding of the spot welding areas 39.

Figure 4:
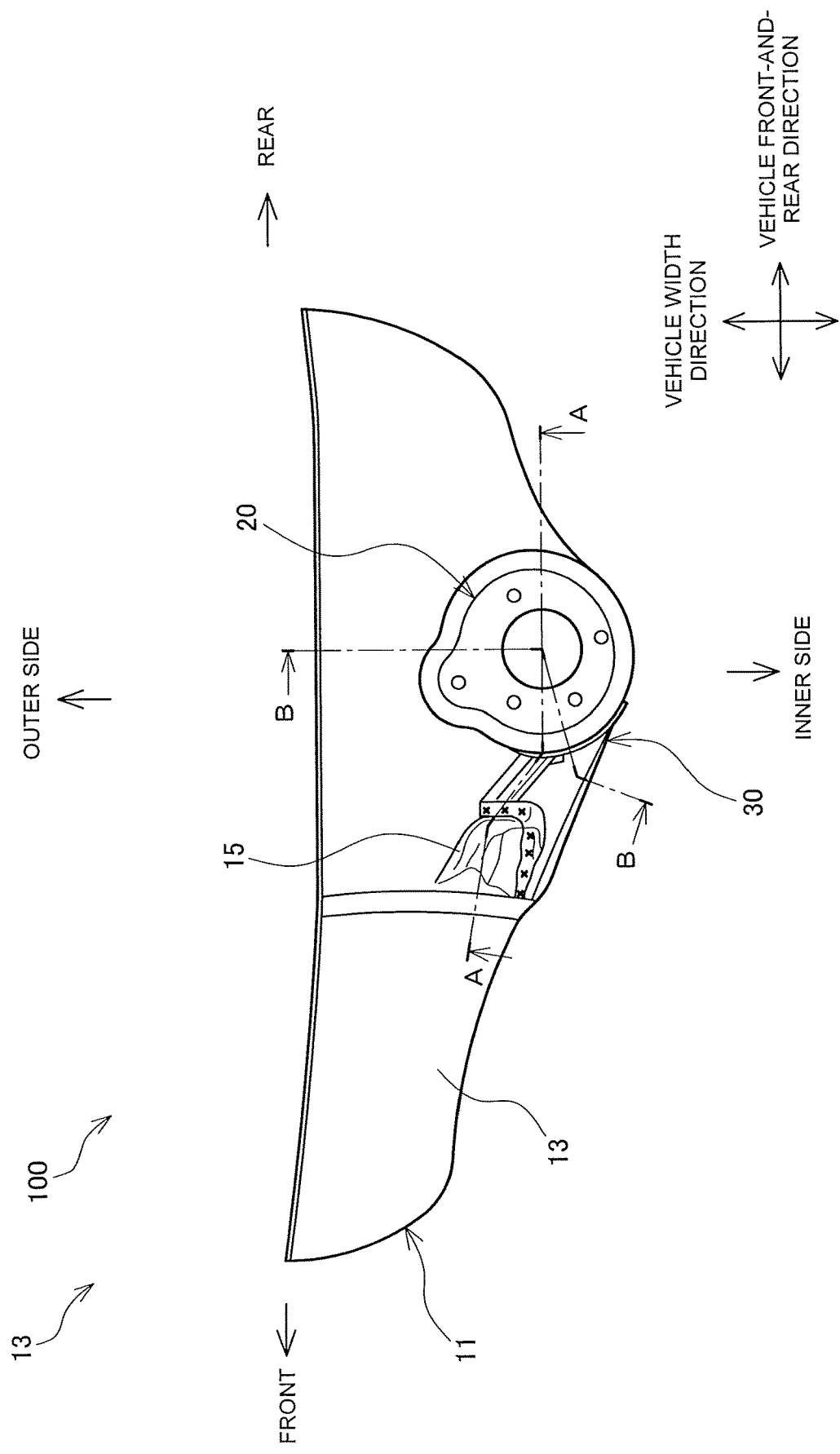
FIG. 4 is a plan view showing a wheel house unit structure according to an embodiment of the present disclosure.
Figure 5:
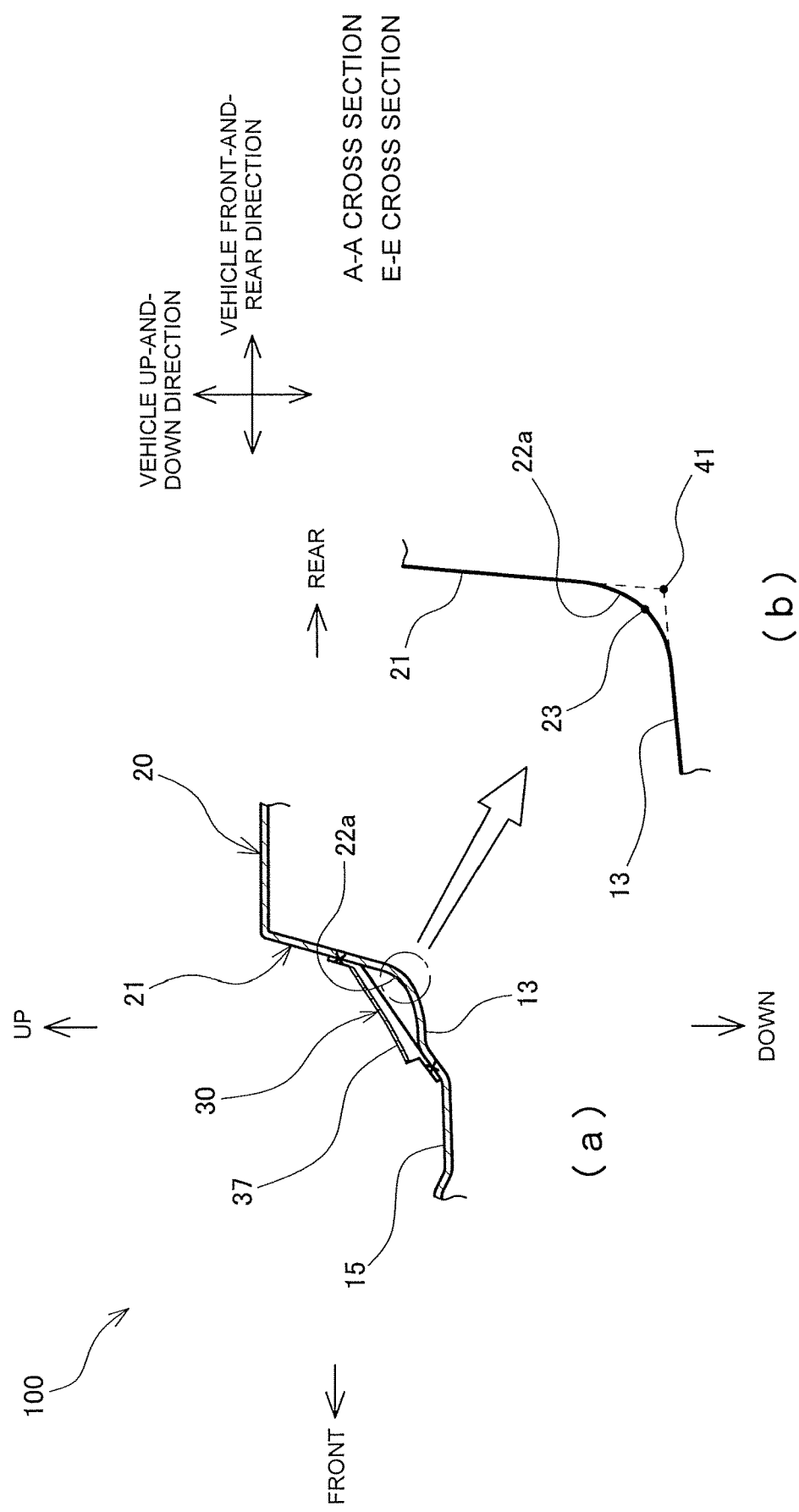
FIG. 5 is a cross-sectional diagram showing an A-A cross section shown in FIG. 4 and an E-E cross section shown in FIG. 14.

FIG. 4 is a plan view of the wheel house unit structure 100, viewed from above the vehicle, and FIG. 5 shows in (a) and (b) an A-A cross section of FIG. 4. As shown in (a) in FIG. 5, in the A-A cross section, the tube portion 21 which extends in the up-and-down direction of the vehicle and the vehicle upper portion of the curved surface portion 13 which extends in the vehicle front side in an approximate horizontal direction are connected by the arc-shape connection part 22a. As shown in (b) of FIG. 5, a crossing line between an extension surface, in the up-and-down direction of the vehicle, of the surface of the tube portion 21, and an extension surface, in the horizontal direction of the vehicle, of the vehicle upper portion of the curved surface portion 13 is a ridgeline 41 of tube portion 21 and the vehicle upper portion of the curved surface portion 13. Moreover, a line corresponding to the ridgeline 41 on the connection part 22a, that is, a line connecting points of equal distance from the tube portion 21 and the vehicle upper portion of the curved surface portion 13 along the connection part 22a, is a valley bottom line 23 of the tube portion 21 and the vehicle upper portion of the curved surface portion 13. As shown by a narrow line in FIG. 2, the valley bottom line 23 is an arc-shape line positioned at the vehicle front side of the suspension tower 20. The ridgeline 41 also is a line which forms a starting point of deformation by the suspension tower 20 at the rear side of the vehicle falling toward the vehicle front side when loads of opposite phases in the up-and-down direction are input to the left and right suspension towers at the vehicle front side, and a twisting load is applied to the vehicle body.

As shown in (a) of FIG. 5, the ridge 37 of the reinforcement member 30 extends over the connection part 22a, the valley bottom line 23, and the ridgeline 41, connects the tube portion 21 of the suspension tower 20 and the vehicle upper portion of the curved surface portion 13, at the vehicle front side, of the wheel house 10, and forms the closed cross section structure with the vehicle upper portion of the curved surface portion 13 and the outer circumference of the tube portion 21 of the suspension tower 20.

Figure 6:
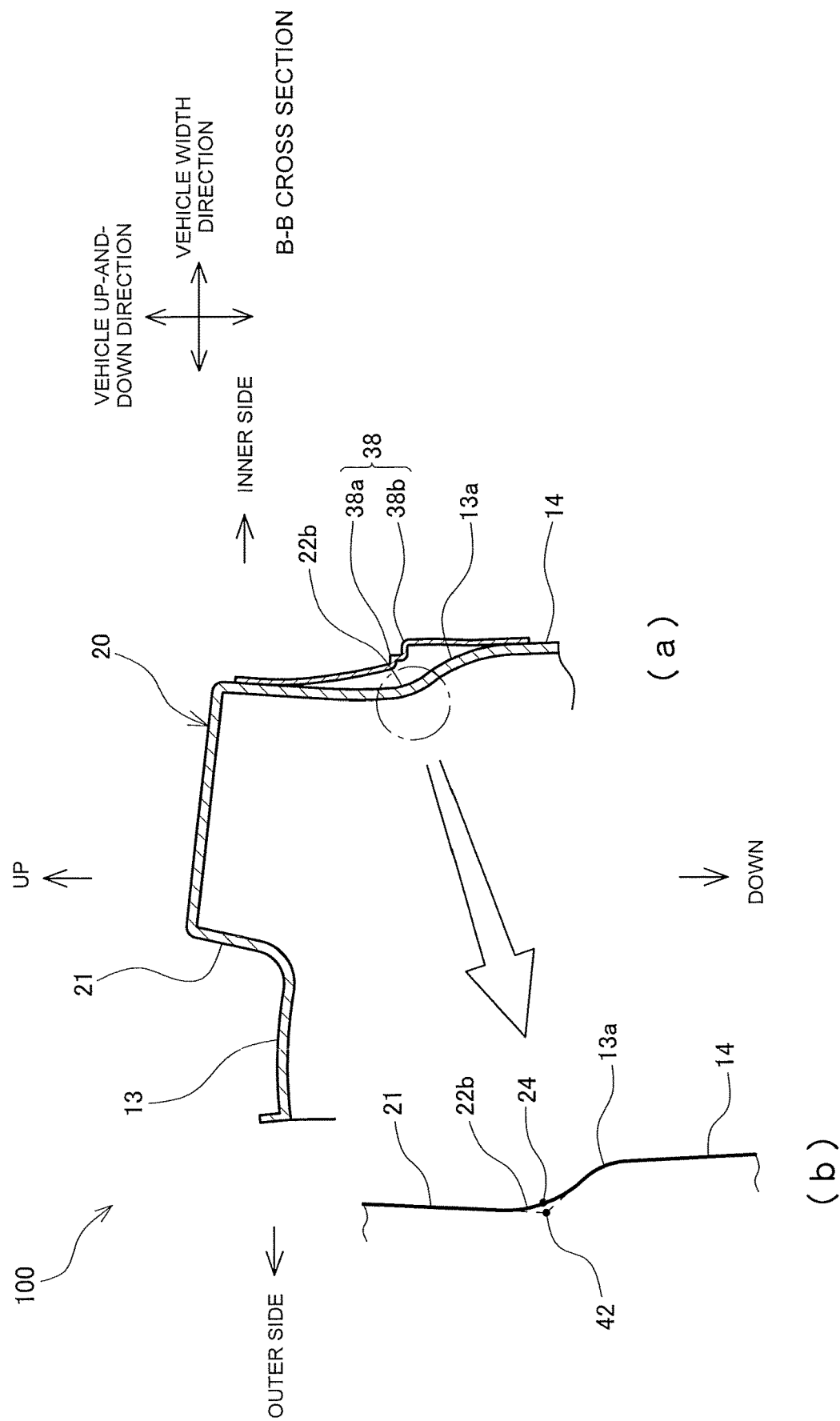
FIG. 6 is a cross-sectional diagram showing a B-B cross section shown in FIG. 4.

FIG. 6 shows in (a) and (b) a B-B cross section of FIG. 4. As shown in (a) of FIG. 6, in the B-B cross section, the tube portion 21 of the suspension tower 20 which extends in the up-and-down direction of the vehicle and the shoulder 13a of the curved surface portion 13 at the inner side, in the width direction of the vehicle, of the wheel house 10 are connected by the arc-shape connection part 22b. As shown in (b) of FIG. 6, a crossing line between an extension surface of a surface, in the up-and-down direction of the vehicle, of the tube portion 21 and an extension surface of the shoulder 13a of the curved surface portion 13 at the inner side in the width direction of the vehicle is a ridgeline 42 of the tube portion 21 and the shoulder 13a of the curved surface portion 13 at the inner side in the width direction of the vehicle. In addition, a line corresponding to the ridgeline 42 on the connection part 22b, that is, a line connecting points of equal distance from the tube portion 21 and the shoulder 13a of the curved surface portion 13 at the inner side in the width direction of the vehicle, along the connection part 22b, is a valley bottom line 24 of the tube portion 21 and the shoulder 13a of the curved surface portion 13 at the inner side in the width direction of the vehicle. As shown by a narrow line in FIG. 2, the valley bottom line 24 is an arc-shape line positioned at the inner side of the vehicle below the tube portion 21 of the suspension tower 20. In addition, the ridgeline 42 is a line which forms a starting point of collapse of the connection part 22b when loads of opposite phases in the up-and-down direction are input to the left and right suspension towers at the front side of the vehicle and a twisting load is applied to the vehicle body.

As shown in (a) of FIG. 6, the reinforcement member 30 extends over the connection part 22b, the valley bottom line 24, the ridgeline 42, and the shoulder 13a of the curved surface portion 13 at the inner side in the width direction of the vehicle, connects the inner side, in the width direction of the vehicle, of the tube portion 21 of the suspension tower 20 and the inner side, in the width direction of the vehicle, of the skirt portion 14 of the wheel house 10, and forms a closes cross section structure with the skirt portion 14 and the tube portion 21 of the suspension tower 20.

Figure 7:
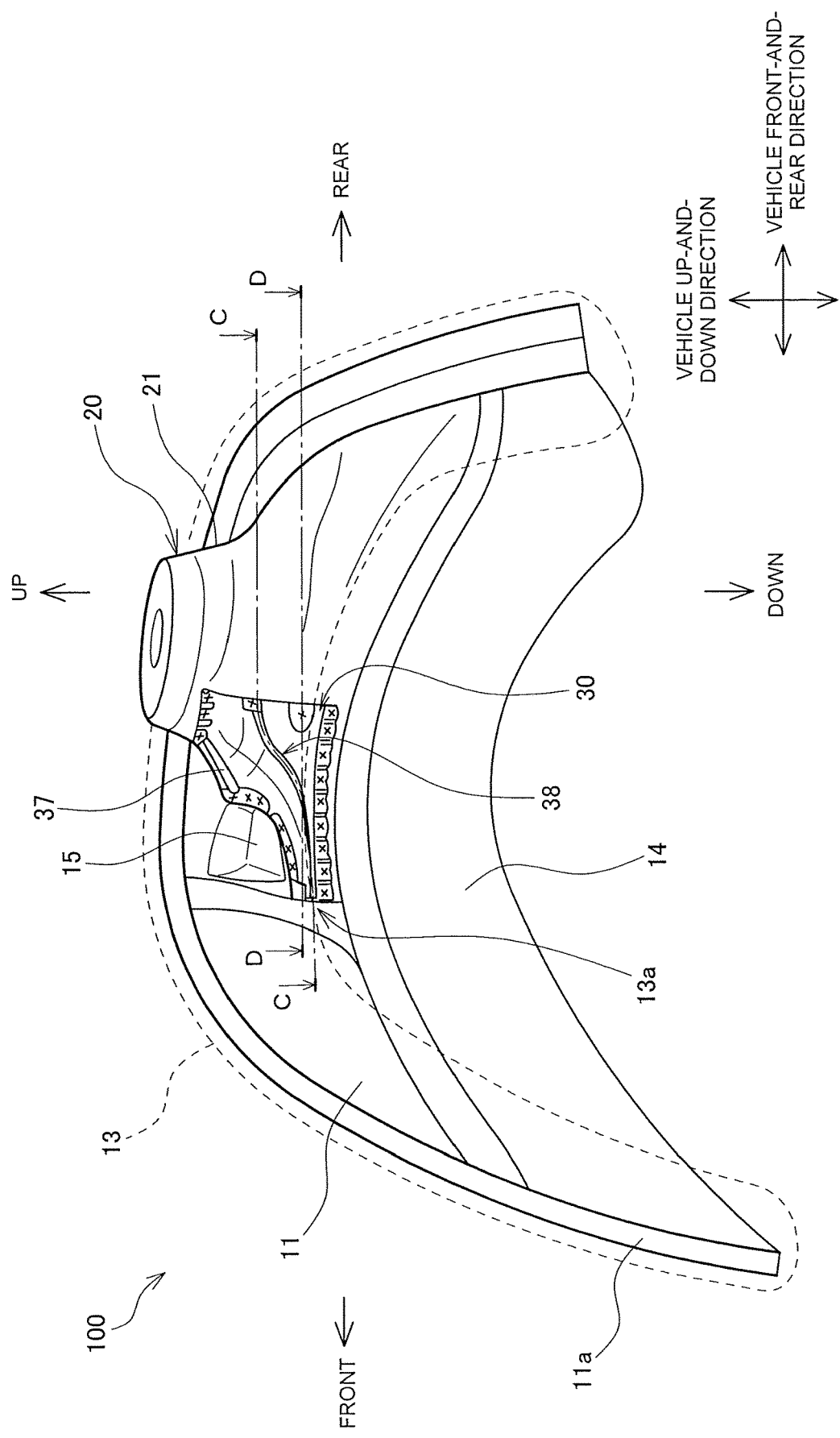
FIG. 7 is an elevation view showing a wheel house unit structure according to an embodiment of the present disclosure.
Figure 8:
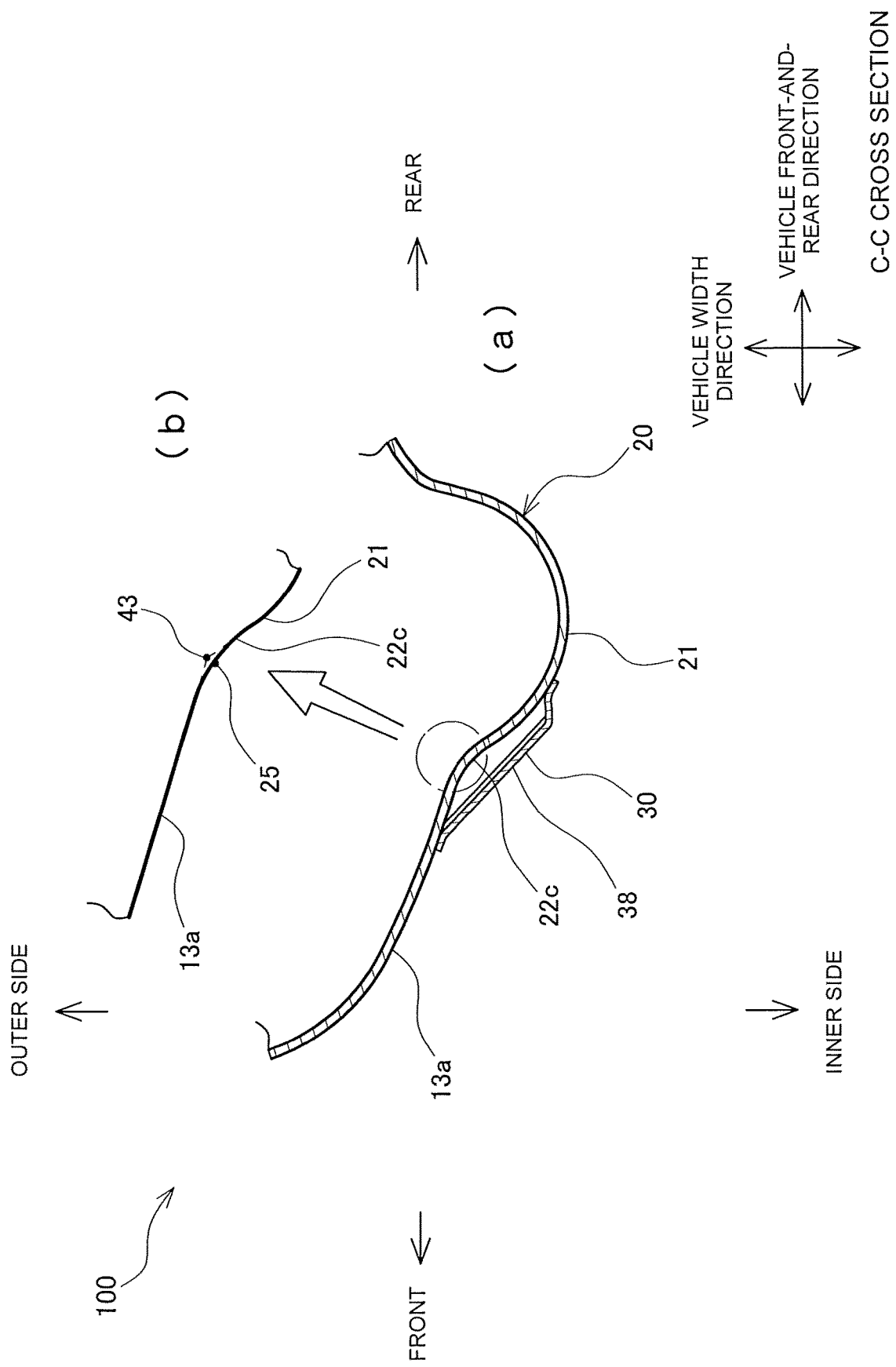
FIG. 8 is a cross-sectional diagram showing a C-C cross section shown in FIG. 7.

FIG. 7 is an elevation view of the wheel house unit structure 100, and FIG. 8 shows in (a) and (b) a C-C cross section of FIG. 7. The C-C cross section of FIG. 7 is a cross section along the side ridge 38 of the reinforcement member 30. As shown in (a) of FIG. 8, in the C-C cross section, a tubular surface of the tube portion 21 and the shoulder 13a of the curved surface portion 13, at the vehicle front side, of the wheel house 10 are connected by the arc-shape connection part 22c. As shown in (b) of FIG. 8, a crossing line between an extension surface of the tubular surface of the tube portion 21 and an extension surface, in the front-and-rear direction of the vehicle, of the shoulder 13a of the curved surface portion 13 is a ridgeline 43 of the tube portion 21 and the shoulder 13a of the curved surface portion 13. In addition, a line corresponding to the ridgeline 43 on the connection part 22c, that is, a line connecting points of equal distance from the tube portion 21 and the shoulder 13a of the curved surface portion 13 along the connection part 22c, is a valley bottom line 25 of the tube portion 21 and the shoulder 13a of the curved surface portion 13. As shown by a narrow line in FIG. 2, the valley bottom line 25 is a line which extends in the up-and-down direction of the vehicle at the tube portion 21 of the suspension tower 20, crosses the valley bottom lines 23 and 24, and extends to the shoulder 13a of the curved surface portion 13 at the vehicle front side. Moreover, the ridgeline 43 is a line which forms a starting point of collapse of the connection part 22c when loads of opposite phases in the up-and-down direction are input to the left and right suspension towers at the vehicle front side and a twisting load is applied to the vehicle body.

As shown in (a) of FIG. 8, the side ridge 38 of the reinforcement member 30 extends over the connection part 22c, the valley bottom line 25, and the ridgeline 43, connects the tube portion 21 of the suspension tower 20 and the shoulder 13a of the curved surface portion 13, at the vehicle front side, of the wheel house 10, and forms a closed cross section structure with the tube portion 21 of the suspension tower 20 and the shoulder 13a of the curved surface portion 13, at the vehicle front side, of the wheel house 10.

As described, the ridge 37 of the reinforcement member 30 extends over the connection part 22a, the valley bottom line 23, and the ridgeline 41, and connects the tube portion 21 of the suspension tower 20 and the vehicle upper portion of the curved surface portion 13, at the vehicle front side, of the wheel house 10. With this structure, when the loads of opposite phases in the up-and-down direction are input to the left and right suspension towers at the vehicle front side and a twisting load is applied to the vehicle body, a load transfer path bypassing the ridgeline 41 and the connection part 22a is formed, and it becomes possible to suppress deformation due to falling of the suspension tower 20 at the rear side of the vehicle toward the vehicle front side with the ridgeline 41 and the connection part 22a as a starting point.

In addition, the side ridge 38 of the reinforcement member 30 extends over the connection part 22c, the valley bottom line 25, and the ridgeline 43, and connects the tube portion 21 of the suspension tower 20 and the shoulder 13a of the curved surface portion 13, at the vehicle front side, of the wheel house 10. With this structure, when the loads of the opposite phases in the up-and-down direction are input to the left and right suspension towers at the vehicle front side and a twisting load is applied to the vehicle body, a load transfer path bypassing the ridgeline 43 and the connection part 22c is formed, and it becomes possible to suppress deformation by collapse of the connection part 22c with the ridgeline 43 as a starting point.

Further, the reinforcement member 30 forms closed cross section structures with the vehicle upper portion of the curved surface portion 13 and the outer circumference of the tube portion 21 of the suspension tower 20, with the inner side, in the width direction of the vehicle, of the skirt portion 14 and the tube portion 21 of the suspension tower 20, and with the tube portion 21 of the suspension tower 20 and the shoulder 13a of the curved surface portion 13, at the vehicle front side, of the wheel house 10. With this structure, the rigidity of the wheel house unit structure 100 as a whole can be increased, and deformation of the connection parts 22a, 22b, and 22c between the wheel house 10 and the suspension tower 20 when the twisting load is applied to the vehicle body can be effectively suppressed.

Moreover, the reinforcement member 30 is a structure obtained by fold molding a plate member by press machining or the like, and an increase in weight when the reinforcement member 30 is attached is smaller than that in the case where thickness of the wheel house 10 is increased. Because of this, the wheel house unit structure 100 of the present embodiment can effectively suppress deformation of the connection parts 22a, 22b, and 22c between the wheel house 10 and the suspension tower 20, with a small increase in weight.

Figure 9A:
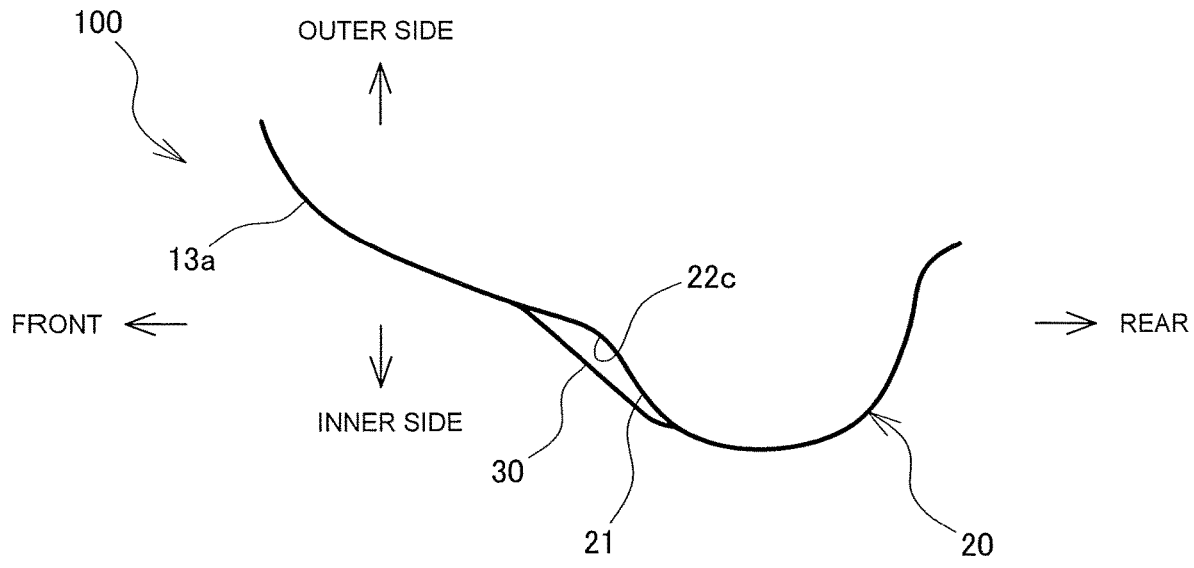
FIG. 9A is a planar cross-sectional diagram showing a state before deformation in a deformation analysis model of a wheel house unit structure according to an embodiment of the present disclosure (D-D cross section of FIG. 7)

Next, with reference to FIGS. 9A and 9B, deformation of the wheel house unit structure 100 will be described for the case where the loads of opposite phases in the up-and-down direction are input to the left and right suspension towers at the vehicle front side of a vehicle having the wheel house unit structure 100 of the present embodiment and a twisting load is applied to the vehicle body. FIG. 9A is a planar cross-sectional view showing a state of a D-D cross section of FIG. 7 of a deformation analysis model of the wheel house unit structure 100 before deformation, and FIG. 9B is a planar cross-sectional view showing a state after the deformation.

Figure 9B:
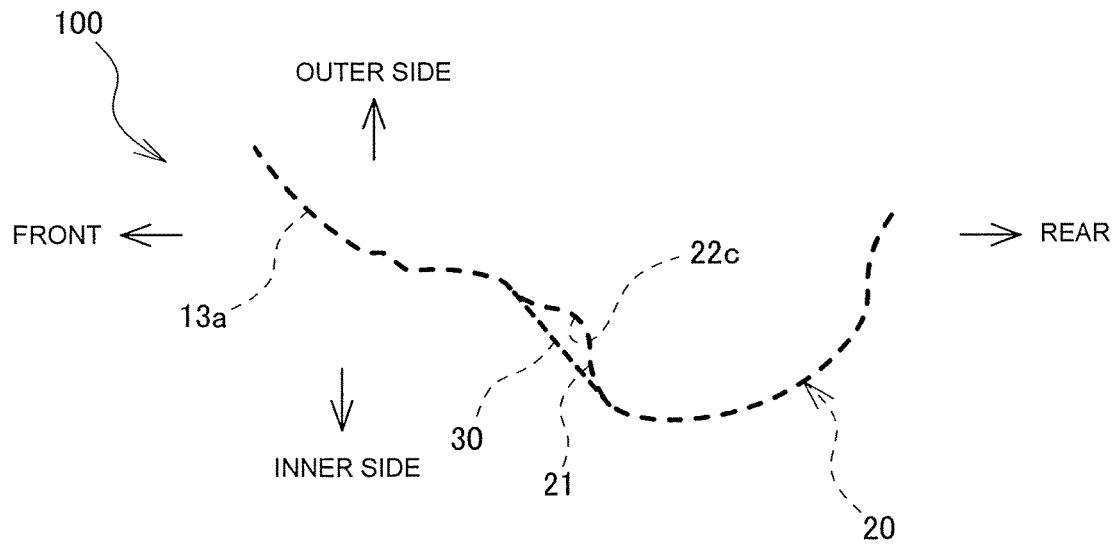
FIG. 9B is a planar cross-sectional diagram showing a state after deformation in a deformation analysis model of a wheel house unit structure according to an embodiment of the present disclosure (D-D cross section of FIG. 7)

As shown in FIG. 9B, the reinforcement member 30 connects the shoulder 13a of the curved surface portion 13, at the vehicle front side, of the wheel house 10 and the tube portion 21 of the suspension tower 20, and forms a load path bypassing the connection part 22c. Because of this, a load in a direction to collapse the connection part 22c is transferred to the reinforcement member 30, the load applied to the connection part 22c is consequently reduced, and significant deformation of the connection part 22c can be suppressed. In addition, the shoulder 13a of the curved surface portion 13, at the vehicle front side, of the wheel house 10, the tube portion 21 of the suspension tower 20, and the reinforcement member 30 form a closed cross section structure, and significant deformation of the connection part 22c is suppressed.

Figure 10A:
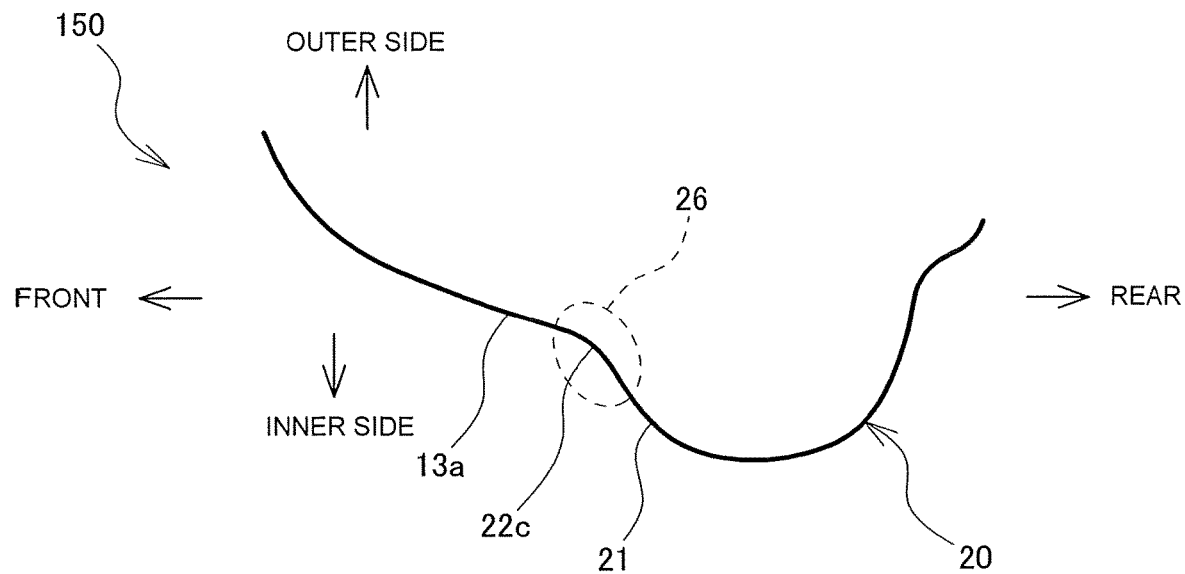
FIG. 10A is a planar cross-sectional diagram showing a state before deformation in a deformation analysis model of a wheel house unit structure according to a Comparative Example.
Figure 10B:
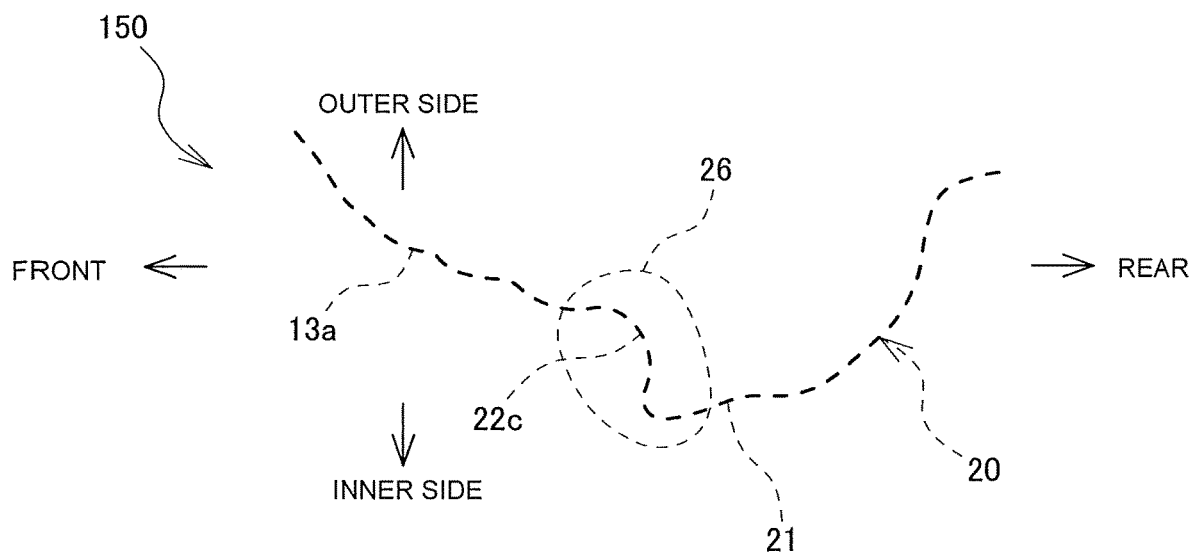
FIG. 10B is a planar cross-sectional diagram showing a state after deformation in a deformation analysis model of a wheel house unit structure according to a Comparative Example.

On the contrary, in a wheel house unit structure 150 according to related art in which the reinforcement member 30 is not attached, as shown in FIG. 10A, when the twisting load is applied to the vehicle body, as shown in FIG. 10B, the load is concentrated in the connection part 22c and a proximate region 26 thereof, the connection part 22c and the proximate region 26 significantly deform, and the suspension tower 20 deforms in a manner to fall toward the vehicle front side.

As described, the wheel house unit structure 100 according to the present embodiment can effectively suppress deformation of the connection parts 22a, 22b, and 22c between the wheel house 10 and the suspension tower 20 with a smaller increase in weight compared to the wheel house unit structure 150 according to the related art.

Next, with reference to FIGS. 11 to 15, a structure of a wheel house unit structure 200 according to another embodiment of the present disclosure will be described. Portions similar to those of the wheel house unit structure 100 explained above with reference to FIGS. 1 to 8 will be assigned similar reference numerals, and will not be described again.

The wheel house unit structure 200 of the present embodiment has a reinforcement member 130 which is smaller than the reinforcement member 30 of the wheel house unit structure 100 described above, and that has an inner ridge 138 formed by a bead of a groove-shape cross section which is convex in the upward direction of the vehicle, in place of the side ridge 38 formed by a folded portion of a plate. The structures of the wheel house 10 and the suspension tower 20 are identical to those of the wheel house unit structure 100.

Figure 11:
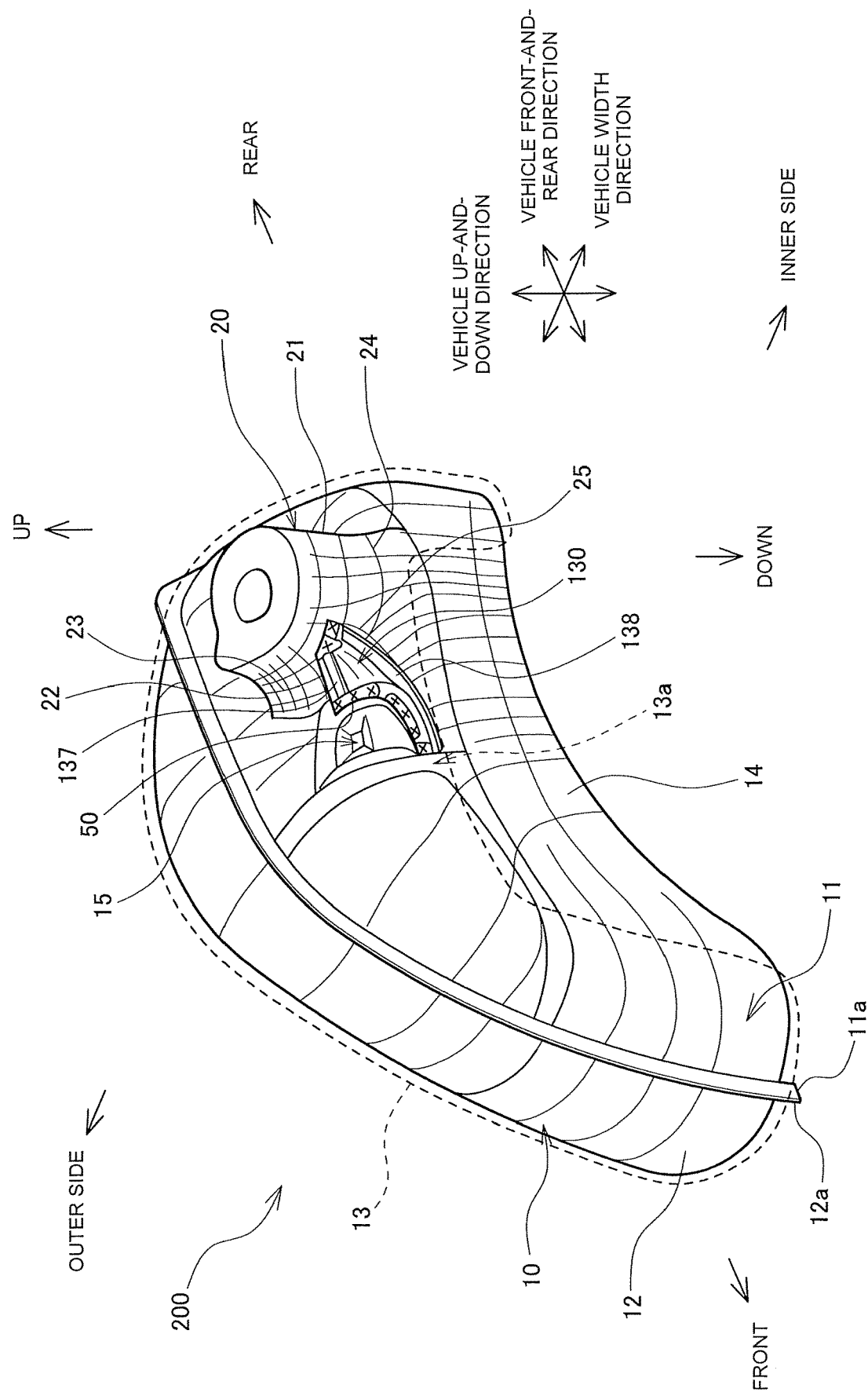
FIG. 11 is a perspective diagram showing a structure of a wheel house unit structure according to another embodiment of the present disclosure.

As shown in FIG. 11, the reinforcement member 130 is a plate member connected to the curved surface portion 13, at the vehicle front side, of the wheel house 10 and the outer circumference of the suspension tower 20, and has a ridge 137 and the inner ridge 138. The ridge 137 and the inner ridge 138 respectively are portions which are convex in the upward direction of the vehicle, which extend in the front-and-rear direction of the vehicle, and which connect, in the front-and-rear direction of the vehicle, the vehicle upper portion of the curved surface portion 13, at the vehicle front side of the wheel house 10 and the shoulder 13a of the curved surface portion 13, with the outer circumference of the tube portion 21 of the suspension tower 20.

Figure 12:
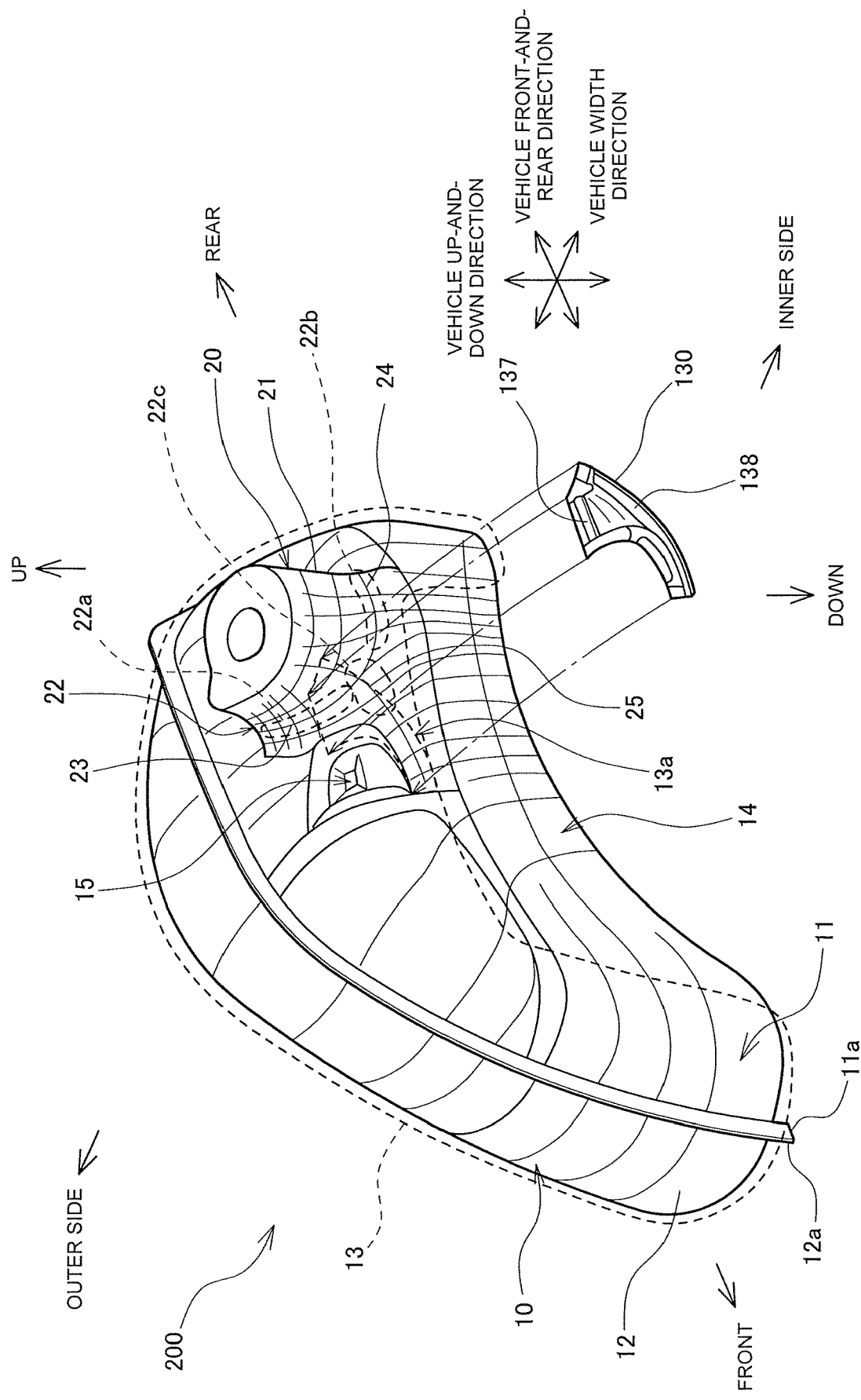
FIG. 12 is an exploded perspective diagram showing a wheel house unit structure according to another embodiment of the present disclosure.

As shown in FIG. 12, the reinforcement member 130 extends over the vehicle upper side of the connection part 22, and is connected to the vehicle upper portion of the curved surface portion 13, at the vehicle front side, of the wheel house 10, the shoulder 13a of the curved surface portion 13, and the outer circumference of the tube portion 21 of the suspension tower 20. The reinforcement member 130 forms a closed cross section structure with the curved surface portion 13, having a reverse U shape, of the wheel house 10, and the outer circumference of the tube portion 21 of the suspension tower 20.

Figure 13:
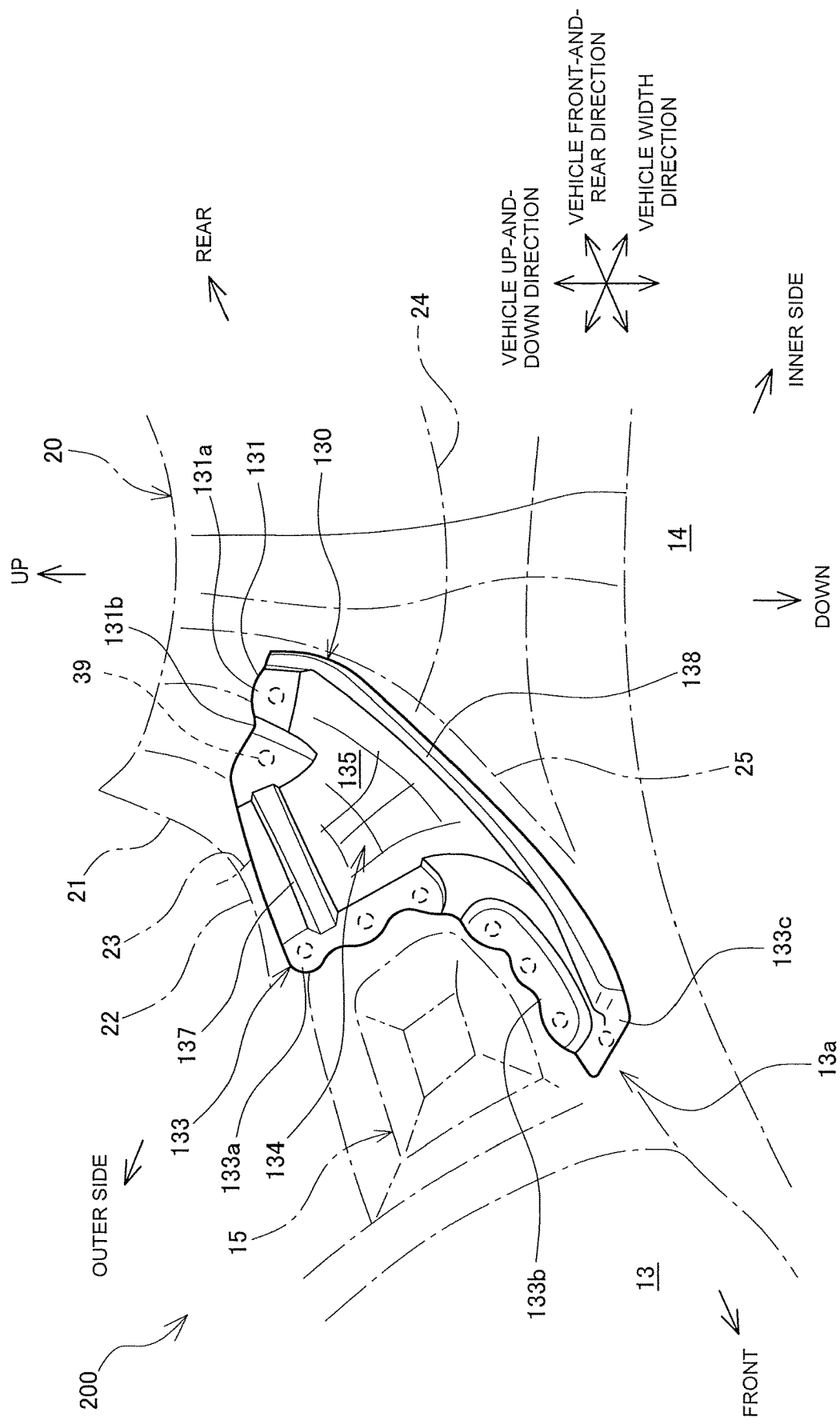
FIG. 13 is a perspective diagram showing a reinforcement member of a wheel house unit structure according to another embodiment of the present disclosure.

As shown in FIG. 13, the reinforcement member 130 includes a suspension tower-side flange 131, an upper flange 133, and a plate portion 134.

The suspension tower-side flange 131 is a plate member having a partial circular cylindrical shape with a central angle of approximately 90 degrees and which is connected to the outer circumference of the tube portion 21 of the suspension tower 20. The suspension tower-side flange 131 includes a reinforcement bead 131b having a groove-shape cross section extending in the up-and-down direction of the vehicle, and an arc plate portion 131a which includes a spot welding area 139 between the arc plate portion 131a and the reinforcement bead 131b. The upper flange 133 is a plate member connected to the curved surface portion 13, having a reverse U shape and at the vehicle front side, of the wheel house 10. The upper flange 133 includes a first flange 133a which extends in the width direction of the vehicle on the side of the suspension tower 20, a second flange 133b which extends in the front-and-rear direction of the vehicle at the inner side, in the width direction of the vehicle, of the first flange 133a, and a third flange 133c which is provided at an end on the vehicle front side. For the first flange 133a, the second flange 133b, and the third flange 133c, respective spot welding areas 39 are provided.

The plate portion 134 is a fold plate member connected to the suspension tower-side flange 131 and the upper flange 133, and the ridge 137 and the inner ridge 138 having the groove-shape cross section which is convex in the upward direction of the vehicle and which extends in the front-and-rear direction of the vehicle are respectively provided at an outer side thereof in the width direction of the vehicle and at an inner side thereof in the width direction of the vehicle.

Figure 14:
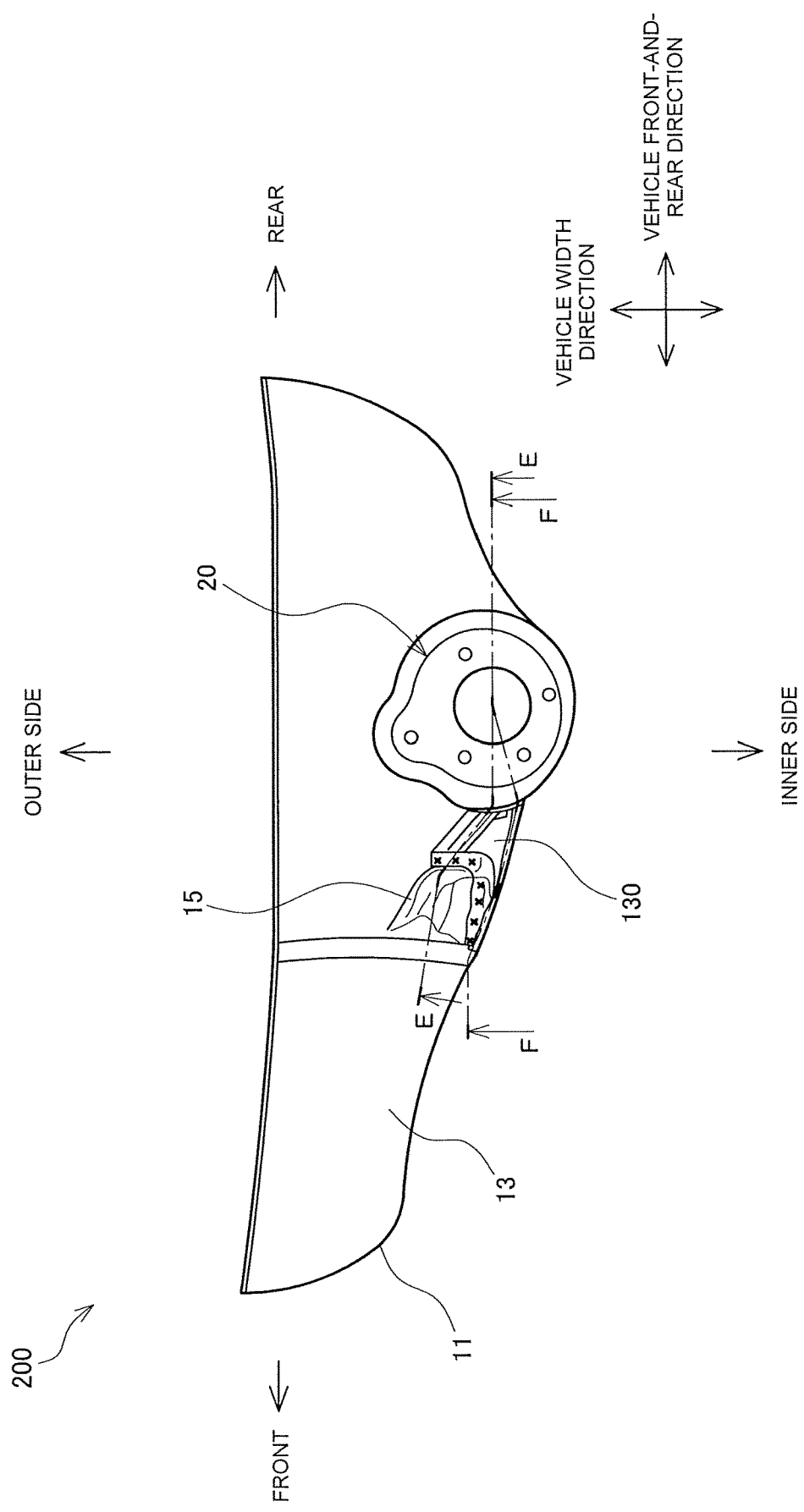
FIG. 14 is plan view showing a wheel house unit structure according to another embodiment of the present disclosure.
Figure 15:
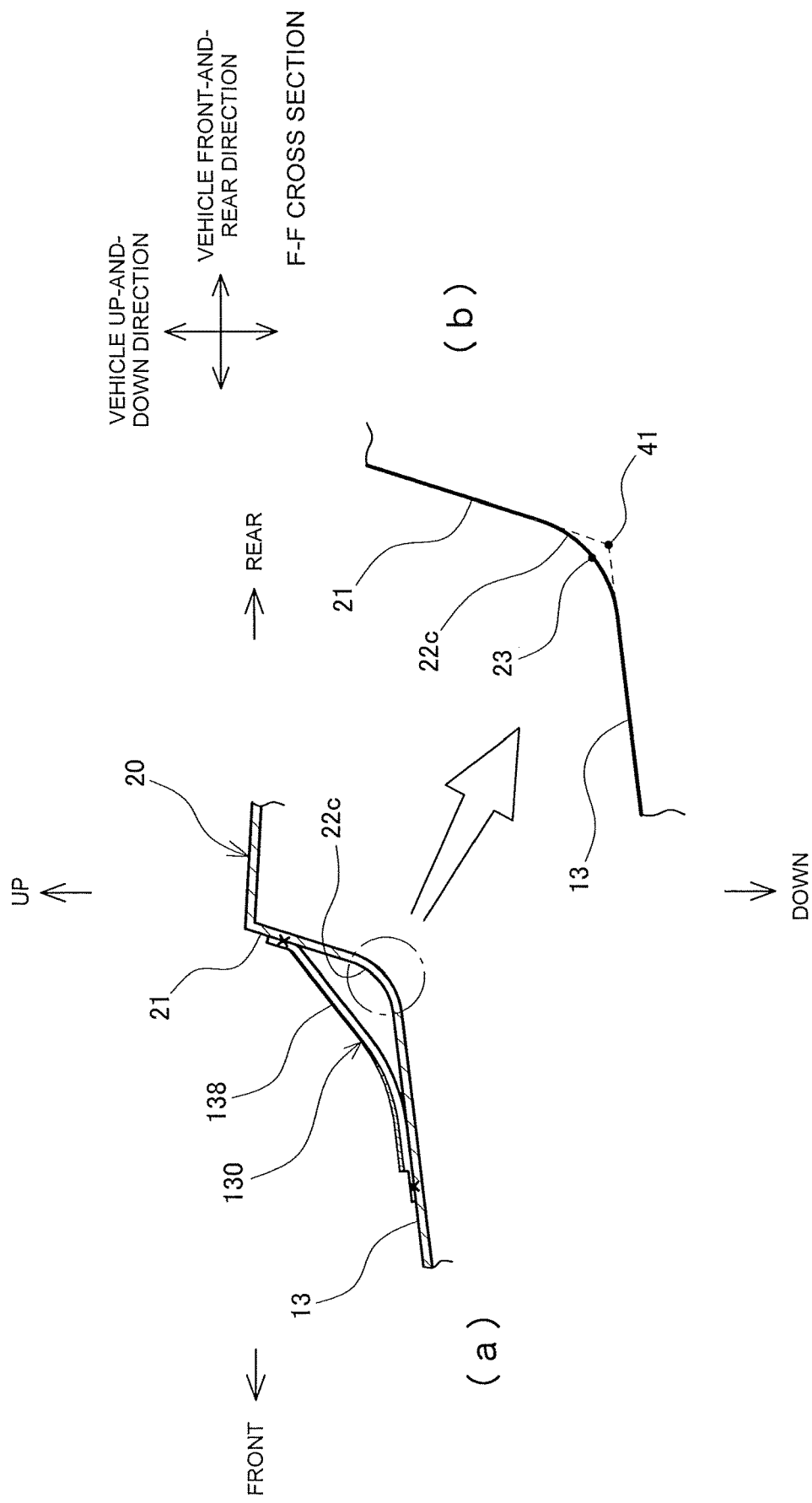
FIG. 15 is a cross-sectional diagram of an F-F cross section shown in FIG. 14.

FIG. 14 is a plan view of the wheel house unit structure 100 viewed from above the vehicle, and FIG. 15 shows in (a) and (b) an F-F cross section of FIG. 14. An E-E cross section of FIG. 14 is identical to the A-A cross section of FIG. 5, and thus will not be described again. As shown in (a) of FIG. 15, in the F-F cross section, the tube portion 21 which extends in the up-and-down direction of the vehicle, and the shoulder 13a of the curved surface portion 13 which extends in the vehicle front side in an approximately horizontal direction, are connected by the arc-shape connection part 22c. As already described above with reference to (a) and (b) in FIG. 5, the ridgeline 41 and the valley bottom line 23 are defined.

As shown in (a) of FIG. 15, the inner ridge 138 of the reinforcement member 130 extends over the connection part 22c, the valley bottom line 23, and the ridgeline 41, and connects the tube portion 21 of the suspension tower 20 and the shoulder 13a of the curved surface portion 13, at the vehicle front side, of the wheel house 10. In addition, similar to the reinforcement member 30 which is already described, the ridge 137 of the reinforcement member 130 extends over the connection part 22a, the valley bottom line 23, and the ridgeline 41, and connects the tube portion 21 of the suspension tower 20 and the vehicle upper portion of the curved surface portion 13, at the vehicle front side, of the wheel house 10. The reinforcement member 130 forms a closed cross section structure with the vehicle upper portion and the shoulder 13a of the curved surface portion 13, and the outer circumference of the tube portion 21 of the suspension tower 20.

As described above, in the wheel house unit structure 200 of the present embodiment, the ridge 37 and the inner ridge 138 of the reinforcement member 130 extend over the connection parts 22a and 22c, the valley bottom line 23, and the ridgeline 41, and connect the tube portion 21 of the suspension tower 20, and the vehicle upper portion and the shoulder 13a of the curved surface portion 13 of the wheel house 10. With this structure, when loads of opposite phases in the up-and-down direction are input to the left and right suspension towers at the vehicle front side and a twisting load is applied to the vehicle body, a load transfer path bypassing the ridgeline 41 and the connection parts 22a and 22c is formed, and it becomes possible to suppress deformation by falling of the suspension tower 20 at the rear side of the vehicle toward the vehicle front side with the ridgeline 41 and the connection parts 22a and 22c as a starting point.

In addition, the reinforcement member 130 forms a closed cross section structure with the vehicle upper portion and the shoulder 13a of the curved surface portion, and the outer circumference of the tube portion 21 of the suspension tower 20. With this structure, rigidity of the wheel house unit structure 200, having the wheel house 10, the suspension tower 20, and the reinforcement member 130, can be increased as a whole, and the deformation of the connection parts 22a and 22c between the wheel house 10 and the suspension tower 20 when a twisting load is applied to the vehicle body can be effectively suppressed.

As described, similar to the wheel house unit structure 100 described above, the wheel house unit structure 200 of the present embodiment can effectively suppress deformation of the connection parts 22a and 22c between the wheel house 10 and the suspension tower 20 with a small increase in weight.

The invention claimed is:

1. A wheel house unit structure comprising:
   a wheel house having a curved surface portion which is convex in an upward direction of a vehicle, which has a U-shape cross section in a width direction, and which extends, in a front-and-rear direction of the vehicle, in an arc shape which is convex in the upward direction of the vehicle;
   a circular cylindrical suspension tower provided at a vertex region, in the front-and-rear direction of the vehicle, of the curved surface portion of the wheel house; and
   a reinforcement member that is connected to the curved surface portion, at a vehicle front side, of the wheel house, and to an outer circumference of the suspension tower, wherein
   the reinforcement member comprises a ridge which extends in the front-and-rear direction of the vehicle and which connects, in the front-and-rear direction of the vehicle, the curved surface portion, at the vehicle front side, of the wheel house, and the outer circumference of the suspension tower, and the reinforcement member forms a closed cross section structure with the curved surface portion, at the vehicle front side, of the wheel house and the outer circumference of the suspension tower,
   the reinforcement member further comprises:
      a suspension tower-side flange which has a partial circular cylindrical shape and which is connected to the outer circumference of the suspension tower;
      an upper flange which is connected to the curved surface portion, at the vehicle front side, of the wheel house; and
      a plate portion which is connected to the suspension tower-side flange and the upper flange, and
   the ridge is a portion which is provided on the plate portion, which has a groove-shape cross section which is convex in the upward direction of the vehicle, and which extends in the front-and-rear direction of the vehicle.

2. A wheel house unit structure comprising:
   a wheel house having a curved surface portion which is convex in an upward direction of a vehicle, which has a U-shape cross section in a width direction, and which extends, in a front-and-rear direction of the vehicle, in an arc shape which is convex in the upward direction of the vehicle;
   a circular cylindrical suspension tower provided at a vertex region, in the front-and-rear direction of the vehicle, of the curved surface portion of the wheel house; and
   a reinforcement member that is connected to the curved surface portion, at a vehicle front side, of the wheel house, and to an outer circumference of the suspension tower, wherein
   the wheel house includes a flat-shape skirt portion which extends from the curved surface portion in a downward direction of the vehicle, and
   the reinforcement member comprises a ridge and a side ridge which extend in the front-and-rear direction of the vehicle, and which connect, in the front-and-rear direction of the vehicle, the curved surface portion, at the vehicle front side, of the wheel house, and the outer circumference of the suspension tower, and the reinforcement member is connected to the curved surface portion, at the vehicle front side, of the wheel house, the outer circumference of the suspension tower, and an inner side, in the width direction of the vehicle, of the skirt portion of the wheel house, to form closed cross section structures with the curved surface portion, at the vehicle front side, of the wheel house and the outer circumference of the suspension tower, and with the inner side, in the width direction of the vehicle, of the skirt portion of the wheel house and the outer circumference of the suspension tower.

3. The wheel house unit structure according to claim 2, wherein
   the reinforcement member further comprises:
      a suspension tower-side flange which has a partial circular cylindrical shape and which is connected to the outer circumference of the suspension tower;
      a skirt-side flange which is a plate member which has a partial circular disc shape, and which is connected to the inner side, in the width direction of the vehicle, of the skirt portion of the wheel house;
      an upper flange which is connected to the curved surface portion, at the vehicle front side, of the wheel house; and a plate member which is connected to the suspension tower-side flange, the skirt-side flange, and the upper flange, the plate member has an upper plate which connects the suspension tower-side flange and the upper flange, and a side plate which is folded from the upper plate in the downward direction of the vehicle, and which connects the upper plate and the skirt-side flange of the wheel house, the ridge is a portion which is provided on the upper plate, which has a groove-shape cross section which is convex in the upward direction of the vehicle, and which extends in the front-and-rear direction of the vehicle, and the side ridge is a fold portion of the side plate.

* * * * *